Aug. 9, 1927. R. McC. JOHNSTONE Re. 16,702

SLITTING MEANS

Original Filed May 2, 1923 2 Sheets-Sheet 1

INVENTOR
Robert McC Johnstone
BY
R. L. Becker
ATTORNEY

Aug. 9, 1927. R. McC. JOHNSTONE Re. 16,702

SLITTING MEANS

Original Filed May 2, 1923 2 Sheets-Sheet 2

INVENTOR
Robert McC Johnstone
BY
A. V. Bieten
ATTORNEY

Reissued Aug. 9, 1927. Re. 16,702

UNITED STATES PATENT OFFICE.

ROBERT McC. JOHNSTONE, OF ROSELLE PARK, NEW JERSEY, ASSIGNOR TO CAMERON MACHINE COMPANY, OF BROOKLYN, NEW YORK, A CORPORATION OF NEW YORK.

SLITTING MEANS.

Original No. 1,597,800, dated August 31, 1926, Serial No. 636,134, filed May 2, 1923. Application for reissue filed June 16, 1927. Serial No. 199,387.

This invention relates to slitting means and is more particularly designed as an improvement upon the construction disclosed in the application of Cameron and Birch for slitting means, filed August 25, 1920, Ser. No. 405,997.

One of the difficulties encountered in score cutting mechanism is the chattering of the cutters due to the vibration of the machine, and this condition is especially found in heavy duty machines. This chattering is due to the fact that heretofore the cutter supporting lever was relatively cumbersome being made of cast iron and therefore when this lever received an outward impulse, due to vibration, it would tend either to continue to leave the backing roll or not respond quickly enough to its spring pressure to follow the backing roll on the rebound thus causing a hammering or pounding.

The main object and feature of this invention is to provide means whereby this difficulty may be overcome and the invention consists of the features of construction, a preferred embodiment of which is disclosed in the specification and accompanying drawings.

Figures 1, 2, 3:
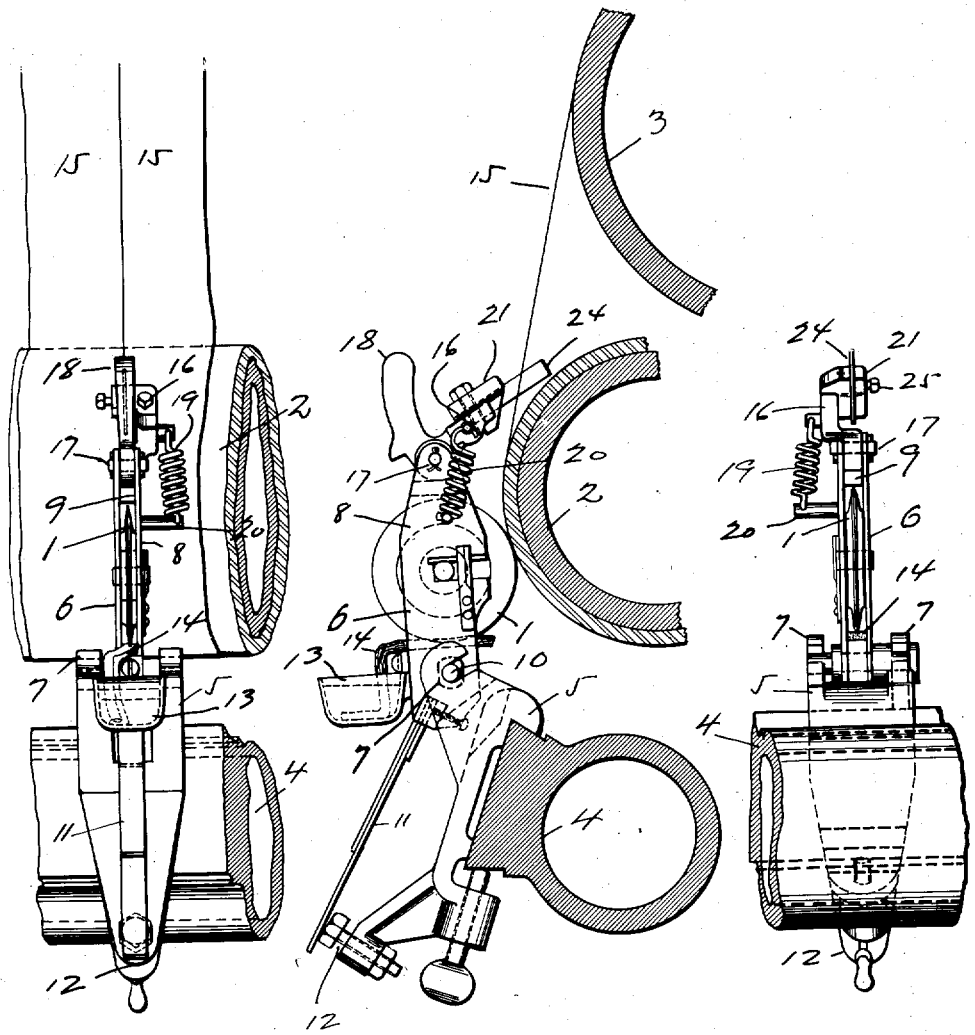
Fig. 1 is a fragmentary view in rear elevation of a slitting device embodying the invention.
Fig. 2 is a fragmentary vertical sectional view of parts of a slitting and winding machine showing the slitting device of my invention in side elevation.
Fig. 3 is a fragmentary view in front elevation of a slitting device embodying the invention.
Figure 4:
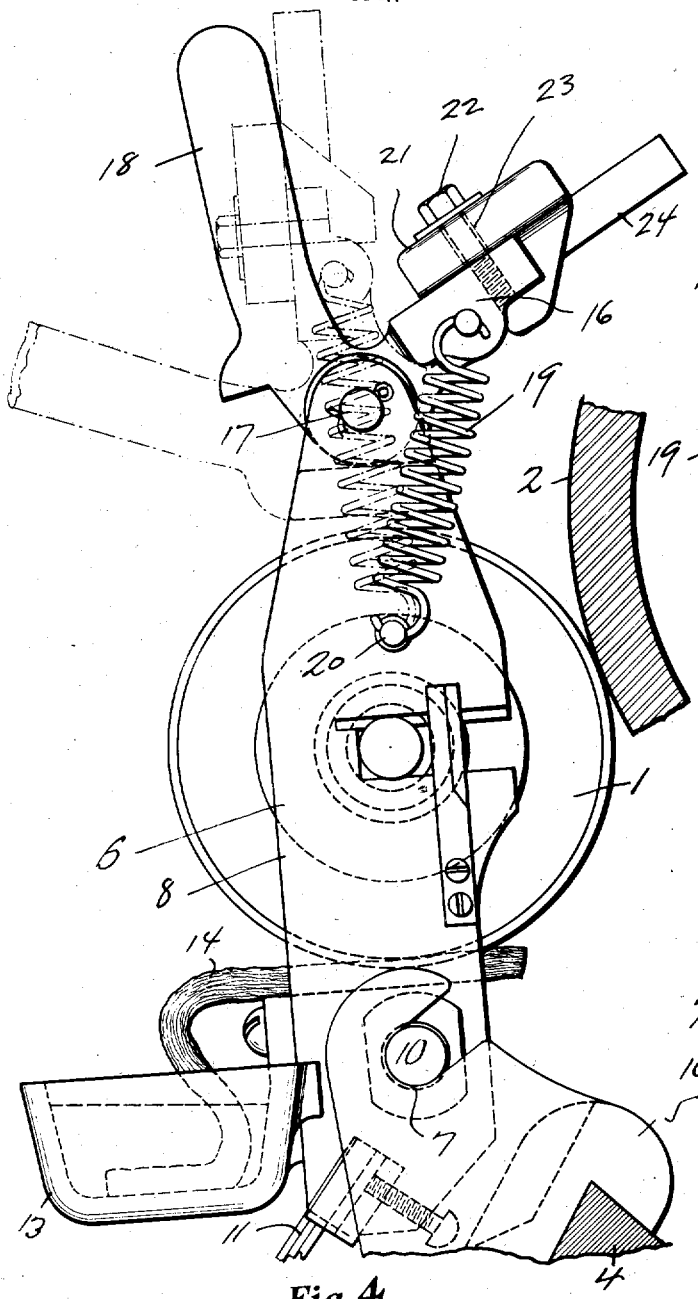
Fig. 4 is a view substantially similar to Fig. 2 but on an enlarged scale.
Figure 5:
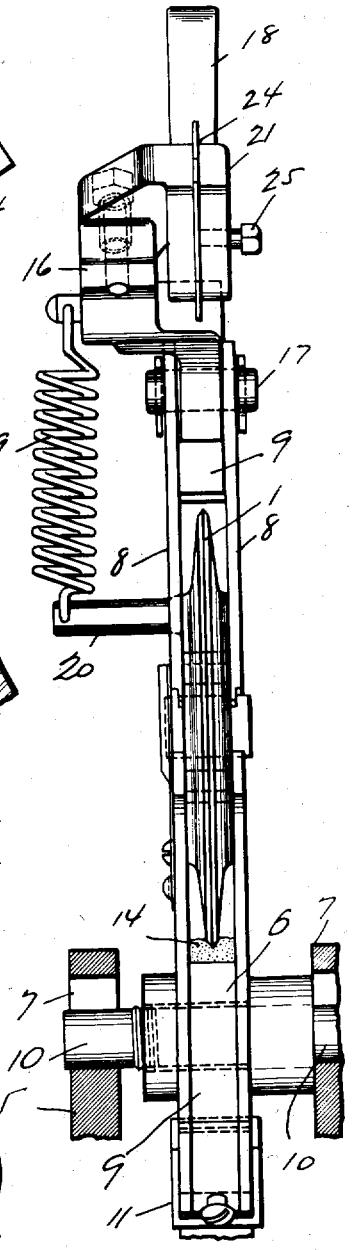
Fig. 5 is a view substantially similar to Fig. 3 but on an enlarged scale and with parts broken away and in section.

1 indicates a score cutter that acts against a backing roll which may be either one of the winding drums but, preferably and as herein disclosed, it is a separate roll 2 just below the front winding drum 3.

Preferably, a rocking support 4 and a carrier 5 transversely adjustable on the rocking support are used as supporting elements of the score cutter device, cutter supporting lever 6 being mounted at its lower end on a pivotal support 7 formed by the carrier. Lever 6 consists of two thin cheek plates 8 of steel connected by blocks 9, the cutter being rotatably mounted between the cheek plates and one block being arranged above and the other below the cutter. Pivotal support 7 of carrier 5 consists of two bearings as shown and the lower block is provided with two pins 10 that rest in the bearings. Carrier 5 may be of any suitable material such as cast iron. Cutter supporting lever 6 is arranged in an upright position and secured to its lower end, preferably on the lower block and at a point below its pivotal support, is a spring means 11 that bears against tail 12 of the carrier to thereby press the cutter against the backing roll. Mounted on lever 6 is a pan 13, preferably of aluminum, containing water, oil or other substance, and 14 is a wick extending from said pan up between the lower block and the cutter. In some cases it is desirable to use a separating device that engages between slitted sections 15 before winding. In this case, a separating bracket 16, preferably of aluminum, is pivotally mounted at 17 at the upper end of lever 6. A handle 18 also of aluminum is employed to turn this bracket into a forward or a rearward position, and a spring 19 anchored at 20 on the lever holds the bracket in either its retracted or advanced position as it will be seen that the spring passes over center 17 when the bracket is adjusted. Carried by the bracket is a separator holder 21 secured in position by bolt 22 passing through slots 23 which latter is elongated transversely so that the holder can be brought into alinement with the slit between adjacent sections. The bracket carries separator blade 24 held in position by screw 25.

The cutter is brought into and out of engagement with the backing roll by turning rocking support 4 and the separator is thrown in and out of action by means of handle 18.

By reason of the light construction of the cutter supporting lever, the objectionable chattering and hammering is to a large extent obviated.

I claim:

1. Slitting means comprising: a backing roll, a score cutter, means for mounting the score cutter including two cheek plates, two blocks, one above and one below the cutter, connecting the cheek plates, a pivotal support engaging the lower block, and a spring member, for pressing the cutter against the backing roll, connected to the lower block.

2. Slitting means comprising: a backing roll, a score cutter, a pivotal support, an upright cutter supporting lever mounted at its lower end on the pivotal support, and a spring member, for pressing the cutter against the backing roll, connected to the lower end of the cutter supporting lever.

3. Slitting means comprising: a backing roll, a score cutter, a pivotal support, an upright cutter supporting lever mounted at its lower end on the pivotal support, and a spring member, for pressing the cutter against the backing roll, connected to the lower end of the cutter supporting lever below its pivot point.

4. Slitting means comprising: a backing roll, a score cutter, an upright cutter supporting lever consisting of two cheek plates, two blocks, one above and one below the cutter, connecting the cheek plates, a pivotal support engaging the lower block, and a spring member, for pressing the cutter against the backing roll, connected to the lower block.

5. Slitting means comprising: a backing roll, a score cutter, an upright cutter supporting lever consisting of two cheek plates, two blocks, one above and one below the cutter, connecting the cheek plates, a pivotal support engaging the lower block, and a spring member, for pressing the cutter against the backing roll, connected to the lower block below its point of pivotal support.

6. Slitting means comprising a backing roll, a score cutter, a pivotal support, an upright cutter supporting lever mounted at its lower end on the pivotal support, a spring member, for pressing the cutter against the backing roll, connected to the lower end of the cutter supporting lever, a pan, containing liquid, mounted at the lower end of the lever, and a wick from said pan extending below the cutter into engagement with the latter.

7. Slitting means comprising: a backing roll, a score cutter, a pivotal support, an upright cutter supporting lever mounted at its lower end on the pivotal support, a spring member, for pressing the cutter against the backing roll, connected to the lower end of the cutter supporting lever, and a web separating device pivotally mounted at the upper end of the lever.

Signed at New York city, in the borough of Brooklyn, in the county of Kings, and State of New York, this 25 day of May, 1927.

ROBERT McC. JOHNSTONE.